United States Patent

Cozian

(10) Patent No.: US 6,270,334 B1
(45) Date of Patent: Aug. 7, 2001

(54) DEVICE FOR AUTOMATIC INSERTION OF A STRIP OF SYNTHETIC FILM INTO A TRANSVERSE DRAWING MACHINE

(75) Inventor: Alain Cozian, La Motte Servolex (FR)

(73) Assignee: Darlet Marchante Technologies S.A., Le Bourget-du-Lac (FR)

( * ) Notice: Subject to any disclaimer, the term of this patent is extended or adjusted under 35 U.S.C. 154(b) by 0 days.

(21) Appl. No.: 09/362,874

(22) Filed: Jul. 29, 1999

(30) Foreign Application Priority Data

Jul. 29, 1998 (FR) .................................................. 98 09941

(51) Int. Cl.⁷ ...................................................... B28B 17/00
(52) U.S. Cl. ........................ 425/196; 425/297; 425/305.1; 425/343; 425/403.1; 425/DIG. 48; 242/526; 242/527; 226/92; 226/110
(58) Field of Search ............................. 425/302.1, 305.1, 425/340, 343, 383, 403.1, DIG. 48, 196, 296, 297; 264/138, 290.2; 226/92, 110; 242/525.2, 526.527

(56) References Cited

U.S. PATENT DOCUMENTS

| | | | |
|---|---|---|---|
| 3,762,250 | 10/1973 | Huskey | 83/27 |
| 4,210,987 | 7/1980 | Benson et al. | 26/89 |
| 4,821,935 | 4/1989 | Caroselli | 226/92 |
| 5,205,504 | * 4/1993 | Kusafuka et al. | 242/56.2 |
| 5,250,246 | * 10/1993 | Totsuka | 264/138 |

FOREIGN PATENT DOCUMENTS

| | | |
|---|---|---|
| 44 15 114 A1 | 4/1994 | (DE) . |
| 0 427 234 A2 | 11/1990 | (EP) . |

* cited by examiner

*Primary Examiner*—Harold Pyon
*Assistant Examiner*—Donald Heckenberg
(74) *Attorney, Agent, or Firm*—Oliff & Berridge PLC

(57) ABSTRACT

This device ensures insertion of a film into the entrance of a transverse drawing machine, leaving a longitudinal drawing machine. This device includes a fixed cylinder with an axis perpendicular to the travel axis of the film, located upstream of the entrance to the transverse drawing machine, whose lower generatrix is located in the film travel plane in the transverse drawing machine, a chest whose axis is perpendicular to the travel axis of the film, mounted on a movable support, so that it can be displaced between a retracted position and a position in which the chest is located between the fixed cylinder and the entrance to the transverse drawing machine, the upper surface of the chest then being disposed substantially in the plane in which the film travels in the transverse drawing machine. The chest serves to accommodate at least one retractable knife, displaceable in the direction of the chest axis and two lifters each associated with a reversing pulley of the transverse drawing machine, which are displaceable between a lower position and a position in which they are located in the plane of travel of tenters that grip the film.

19 Claims, 3 Drawing Sheets

DEVICE FOR AUTOMATIC INSERTION OF A STRIP OF SYNTHETIC FILM INTO A TRANSVERSE DRAWING MACHINE

BACKGROUND OF THE INVENTION

Biaxially oriented films made of synthetic material are obtained from an extruded strip once the material has been deposited in the molten state on a casting drum. The strip then passes into a longitudinal drawing machine in which drawing is accomplished due to the speed differential between various successive cylinders. The strip then passes into a transverse drawing machine in which the strip is held by tenters mounted on chains, of which the spacing increases gradually.

When the system is started, the primary strip is introduced at low speed into the longitudinal drawing machine. When it is introduced, the drawing ratio is approximately 1, so that the strip retains its original thickness. It is accordingly too thick to be introduced directly into the tenters of the transverse drawing machine.

Under these conditions, the strip is first placed on an auxiliary winder disposed between the longitudinal drawing machine and the transverse drawing machine, then the longitudinal drawing ratio is gradually increased either to the final ratio or to an intermediate ratio, which results in reduction of strip thickness and increase of speed.

When the desired drawing ratio is reached, the strip is removed by hand and introduced into the tenters of the transverse drawing machine to be drawn transversely before being brought to a winder disposed downstream of the machine.

When these operations have been performed, the speed is gradually increased up to the desired production speed. However, such operations are complex and dangerous for the operators, and result in a substantial loss of material on fast high-output machines. In a modem system, the production rate is greater than 300 meters of strip per minute, while it is extremely difficult to manually introduce a strip into tenters at production rates greater than 150 meters per minute. The substantial difference between the two speed levels makes it necessary for there to be a speed run-up period which is lengthy, and during which film quality is unsatisfactory and not yet stabilized.

SUMMARY OF THE INVENTION

A goal of the invention is to provide a device for automatically introducing a strip of synthetic material into a transverse drawing machine at high speed with no manual intervention, namely with total safety for the operators.

Another goal of this invention is to provide a drawing system comprising a longitudinal drawing machine, a transverse drawing machine and a device for automatically introducing a strip of synthetic material into the transverse drawing machine at high speed with no manual intervention.

BRIEF DESCRIPTION OF THE DRAWINGS

The invention will be understood with the aid of the description hereinbelow that refers to the attached schematic drawings showing, as a nonlimiting example, one embodiment of this device.

DETAILED DESCRIPTION OF EMBODIMENTS

Figure 1:
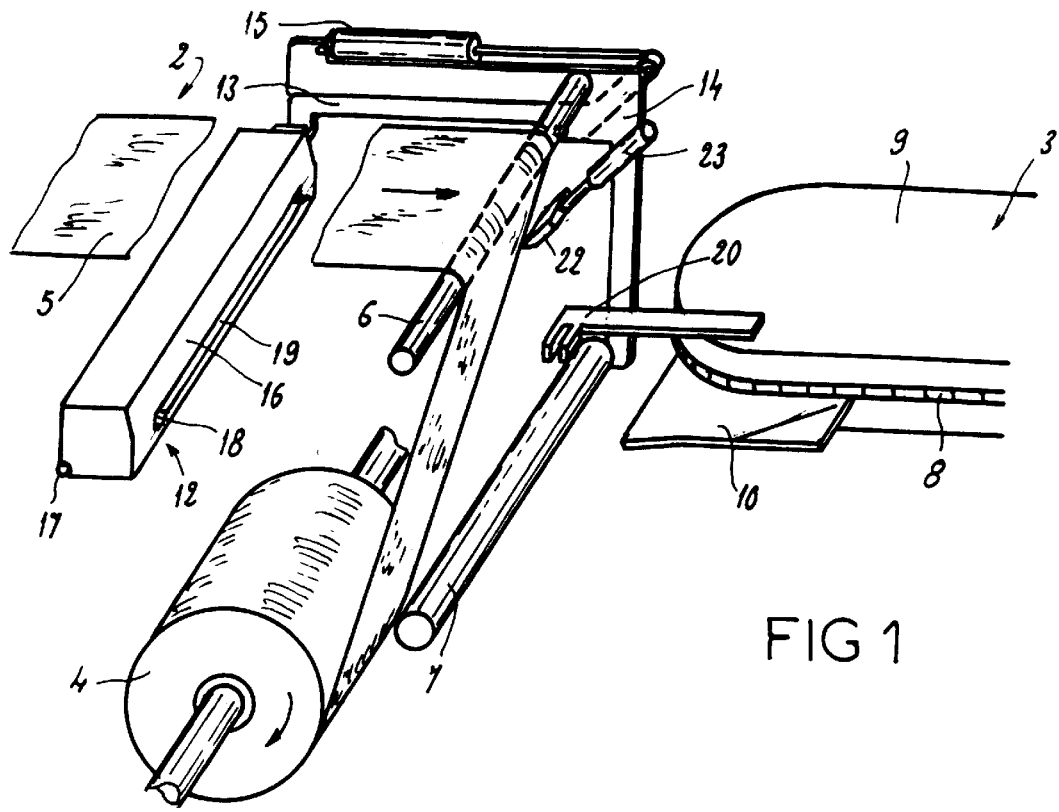
FIGS. 1, 2, 3 and 4 are four perspective views of the device in four operating phases.

In the described embodiments, the device to which this invention relates is intended for automatic insertion of a strip of synthetic film coming from a longitudinal drawing machine into a transverse drawing machine. The transverse drawing machine has two endless chains carrying tenters designed to grip the edges of the film, the two chains gradually spacing transversely apart from the other, with the two chains passing, in the vicinity of the transverse drawing machine entrance, onto reversing pulleys, an auxiliary winding mandrel being disposed at the exit of the longitudinal drawing machine, below said exit.

In the exemplary embodiments of this invention shown in FIGS. 1 to 6, the device according to this invention comprises:

a fixed cylinder with an axis perpendicular to the film travel axis, placed upstream of the entrance to the transverse drawing machine, the lower generatrix of the fixed cylinder being located in the film travel plane in the transverse drawing machine, a chest with an axis perpendicular to the travel axis of the film, mounted on a movable support, and displaceable between a retracted position and a position in which the chest is located between the fixed cylinder and the entrance to the transverse drawing machine, the upper surface of the chest then being disposed substantially in the film travel plane in the transverse drawing machine, the chest serving to accommodate at least one knife displaceable in the direction of the chest axis and retractable so that it either projects or does not project beyond a slot provided in the upper surface of the chest, and two lifters each associated with a reversing pulley of the transverse drawing machine and displaceable between a lower position and a position in which they are located in the travel plane of the film tenters.

While the film strip is being wound up and lowered almost vertically onto the auxiliary winding mandrel, the chest is moved to present the strip in front of the tenters, at the entrance of the transverse drawing machine. After this positioning, the strip is cut, and the cut part is supported on the lifters which position the end of the strip thus formed between the tenters of the transverse drawing machine.

In particular embodiments of the device according to this invention, the two reversing pulleys of the transverse drawing machine are displaceable transversely with respect to each other.

In addition, in particular embodiments of the device according to this invention, both reversing pulleys of the transverse drawing machine are equipped with two detectors detecting the positions of the film edges, which prevent the reversing pulleys from coming together when the bottoms of the tenters are aligned with the film edges. Advantageously in this case, the film edge position detectors are mechanically connected to the two reversing pulleys and are disposed upstream of the fixed cylinder. The two reversing pulleys at the entrance of the drawing machine, which are in the separated position, come together until the film edge detectors sense the edges of the film, thus enabling the bottoms of the tenters to be aligned with the edges of the film. In this position, the convergent movement of the reversing pulleys is stopped before the film cutting operation preceding the film being gripped by the tenters of the transverse drawing machine.

In particular embodiments of the device according to this invention, the chest contains two coaxial knives whose movements are controlled symmetrically from the outside toward the center. Advantageously, the knives are driven by a variable-speed system and are mounted on an oscillating system in such a way as to become freely oriented according to the strip cutting angle.

As the strip advances, the two inwardly-moving knives produce a V-shaped cut forming two lateral points of semi-rigid synthetic material which, because they are free of any pulling constraint, continue to move horizontally as long as the central part of the strip continues to be pulled by the auxiliary winding mandrel. The lateral points leaving the chest are immediately taken up, supported, and guided by the two lifters. When the two knives arrive at the center, they approach one another until they are a few millimeters apart, the minimum required for the blades to come to a stop, and the blades are retracted. The opposite pulling forces of the tenters and of the auxiliary winding mandrel cause the small central strip, not cut by the knives, to break.

To prevent propagation or continuation of a tear in the longitudinal drawing direction once the central strip has broken, this device has a knife disposed upstream of the chest, on the strip travel axis, actuated by a pneumatic actuator to perforate the film transversely over a width of several centimeters and prevent any risk of tear propagation once the film has been cut.

In particular embodiments of the device according to this invention, the chest is equipped with a deflecting roller guiding the strip to the auxiliary winding mandrel before it is introduced into the transverse drawing machine.

In particular embodiments of the device according to this invention, the chest is mounted on a chassis pivotably mounted on an arm or the like, which is independent of or belongs to the longitudinal drawing machine.

In particular embodiments of the device according to this invention, this device has control means carrying out the following successive operations after the strip leaves the longitudinal drawing machine or as it is being wound onto the auxiliary winding mandrel:

bringing the chest into its position located between the fixed cylinder and the reversing pulleys at the entrance of the transverse drawing machine, bringing the reversing pulleys together until the bottoms of the tenters are aligned with the film edges, moving the lifters upward, synchronizing the speeds of the chains carrying the tenters with the speed of the longitudinal drawing machine, cutting the strip with the aid of the knives, engaging the cut end of the strip between the tenters, stopping the auxiliary winding mandrel, and retracting the chest.

In the exemplary embodiments shown in FIGS. 1 to 6, the device according to the invention is interposed between exit 2 of a longitudinal drawing machine and entrance 3 of a transverse drawing machine for a strip of film made of synthetic material. At the exit 2 of the longitudinal drawing machine, and under this exit, there is an auxiliary winding mandrel 4 to which strip 5, leaving the longitudinal drawing machine, is applied after passing over a rod 6 whose axis is transverse to the travel direction of the strip. When production is started, strip 5 is wound up on the auxiliary winding mandrel 4, whose speed is controlled by the speed of the longitudinal drawing machine. The operator can carry out the adjustment operations on the longitudinal drawing machine and increase the strip travel speed. Once these adjustments have been made, the next step consists of introducing strip 5 as rapidly as possible into the transverse drawing machine.

This is done with the aid of the device according to the invention. This device has a fixed cylinder 7, whose axis is perpendicular to the strip travel axis, placed upstream of the entrance of the transverse drawing machine, and whose lower generatrix is located in the plane in which the film moves in the transverse drawing machine, this plane being defined by the travel of tenters 8. These tenters 8, shown schematically in the drawings, are mounted on two endless chains; they move gradually apart from each other for the film to be transversely drawn, and both tenters 8 pass, at the machine entrance, on reversing pulleys 9. Each reversing pulley 9 is equipped with a lifter 10 which is substantially horizontal, displaceable between a lower position (FIG. 5) in which it is above the travel plane of the strip, and an upper position (FIGS. 2–4 and 6) in which it is located substantially in the plane of the strip when the strip travels. In FIGS. 1 to 5, only one tenter 8, one reversing pulley 9 and one lifter 10 are shown, in order to better show the device according to this invention.

The device according to the invention also has a chest 12 mounted on a chassis 13, said chassis 13 being pivotably mounted on an arm 14 with the pivoting action being effected by an actuator 15. The chassis 13 and the arm 14 are independent from or belong to the longitudinal drawing machine. While, in order to show the chest 12 in FIG. 1, the strip 5 is not completely represented, the strip 5 is not actually cut between the exit 2 of the longitudinal drawing machine and the rod 6. The chest 12 pivots between a position shown in FIG. 1 where it allows free winding of strip 5 leaving the longitudinal drawing machine onto the auxiliary winding mandrel 4, and an active position, shown in FIGS. 2 to 6, in which the chest 12 is disposed between fixed cylinder 7 and the entrance 3 of the transverse drawing machine, the upper surface 16 of the chest 12, in the phases shown in FIGS. 2 to 6, being located in the travel plane of the strip in the transverse drawing machine. The lower edge of the chest 12, in the phases shown in FIGS. 2 to 6, is equipped with a deflecting roller 17 ensuring that the strip 5 is guided to the auxiliary winding mandrel 4, once it has gone around chest 12.

The chest accommodates two knives 18 (shown in FIGS. 2 to 6) displaceable in the direction of the chest axis, i.e., in a direction perpendicular to the strip travel axis, and retractable, so that they can either project through a slot 19 located in the upper surface 16 of the chest 12, or not project through the slot 19. The two knives 18 are displaced symmetrically from the outside to the center of the chest. This symmetry of movement can be provided by a reverse-pitch screw-nut system, or by a cable system or the like. This displacement is driven by a variable-speed system to allow the speeds and the cutting profile to be controlled and adjusted. Knives 18 are not only retractable but are mounted on an oscillating system so that they can orient themselves freely according to the cutting angle.

The two reversing pulleys 9 are displaceable transversely to the strip movement direction, with respect to each other. Each reversing pulley 9 is equipped with a detector 20 to detect the position of the edge of the strip 5, the detector 20 being disposed upstream of fixed cylinder 7. Signals outputted by these detectors 20 are used to stop the corresponding reversing pulley 9 from coming together, when the detector 20 detects an edge of the strip 5, which means that the bottom of the corresponding tenter 8 is aligned with the strip edge.

Finally, this device has a knife 22 mounted upstream of chest 12, on the strip travel axis, actuated by an actuator 23, preferably a pneumatic actuator. The purpose of the knife 22 is to perforate the strip 5 transversely in the central part of the strip 5 over a width of several centimeters to prevent any tear from propagating.

This device operates as follows:

During the adjustment of the longitudinal drawing machine, film strip 5 descends almost vertically from the rod 6 onto auxiliary winding mandrel 4. When the adjustments have been made and the longitudinal drawing machine has reached its normal operating speed, the strip 5 is introduced into the transverse drawing machine. First, the device is in the position shown in FIG. 1. Chest 12 is then placed in the active position: it assumes the position shown in FIGS. 2 to 6. In this position, the strip passes behind fixed cylinder 7, over the upper surface of chest 12, and passes around the chest 12 after passing over the deflecting roller 17.

Reversing pulleys 9 at the entrance of the transverse drawing machine are apart when in the standby position, then made to approach each other until detectors 20 detect the edges of strip 5. These detectors are mechanically connected to reversing pulleys 9 and are placed just upstream of fixed cylinder 7. They align the bottoms of tenters 8 with the edges of the strip.

Figure 5:
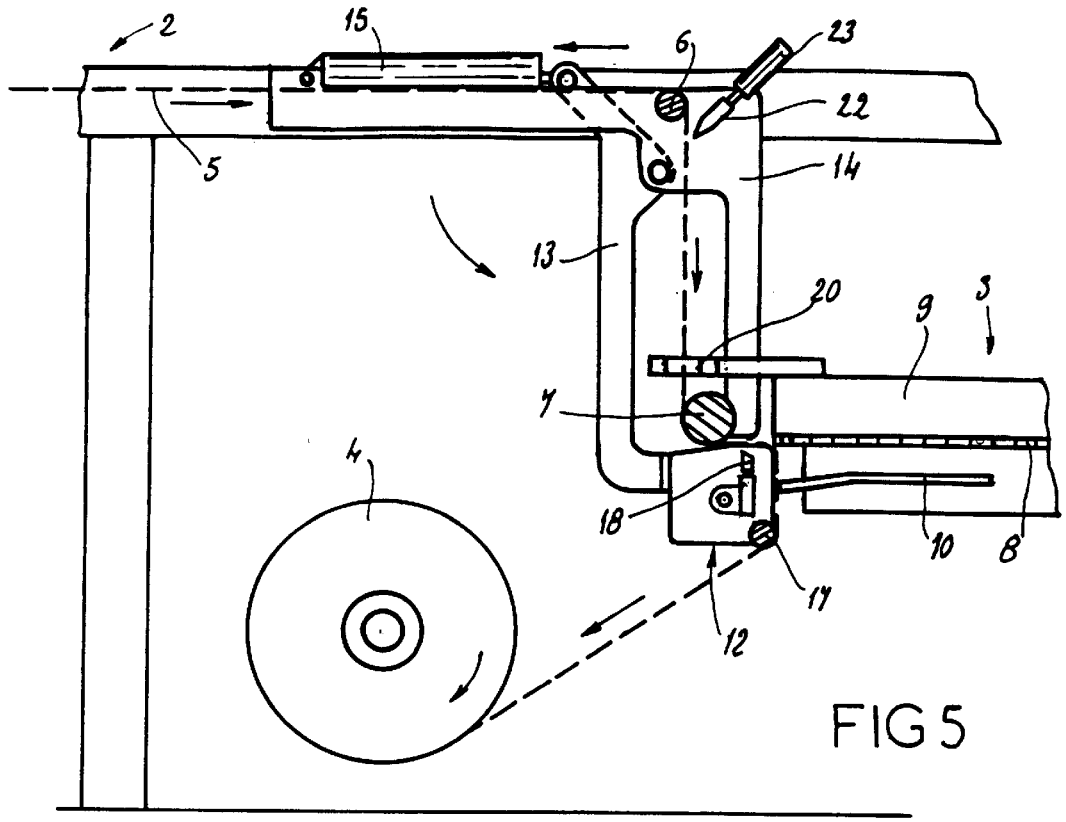
FIG. 5 is a view in lengthwise section just before the phase corresponding to FIG. 2, i.e. before the strip is cut.

The device is then in the position shown in FIG. 5, with the lifters 10 in their lower position. Then the two lifters 10 are brought up to the height of tenters 8. The purpose of these lifters 10 is to support the strip 5 during the phase of insertion into the transverse drawing machine.

At this time, the chains of the transverse drawing machine are synchronized to the speed of the longitudinal drawing machine and the auxiliary winding mandrel.

Figure 2:
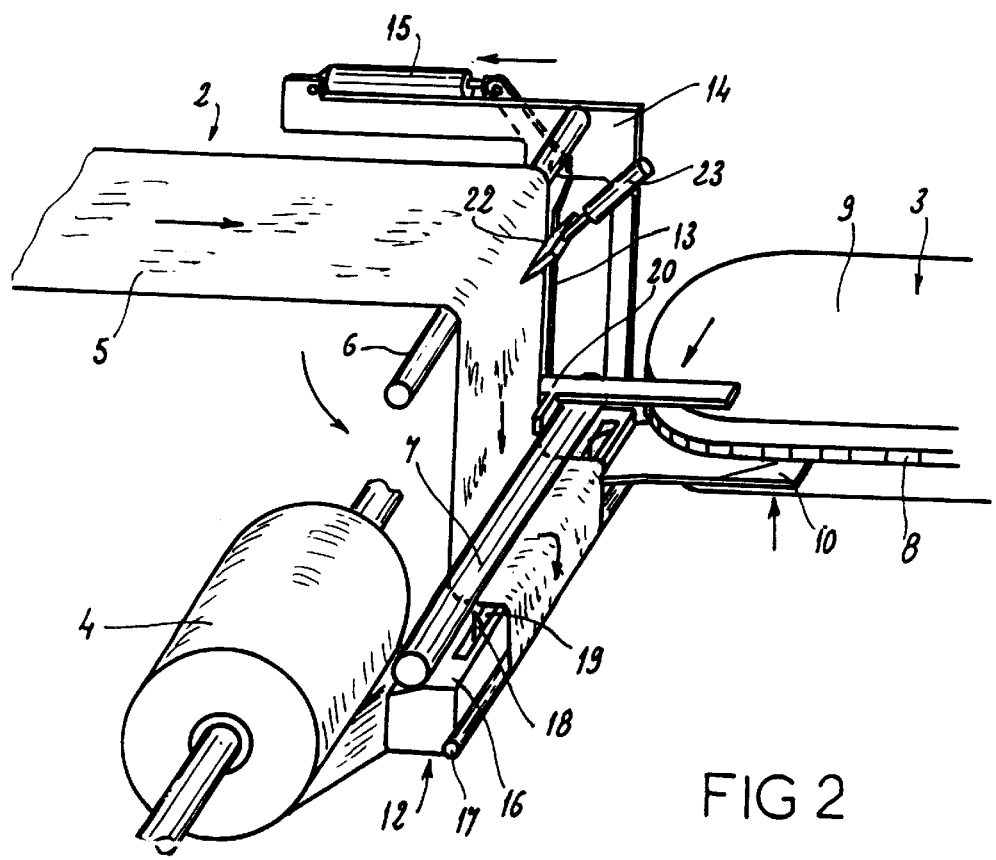
Figure 3:
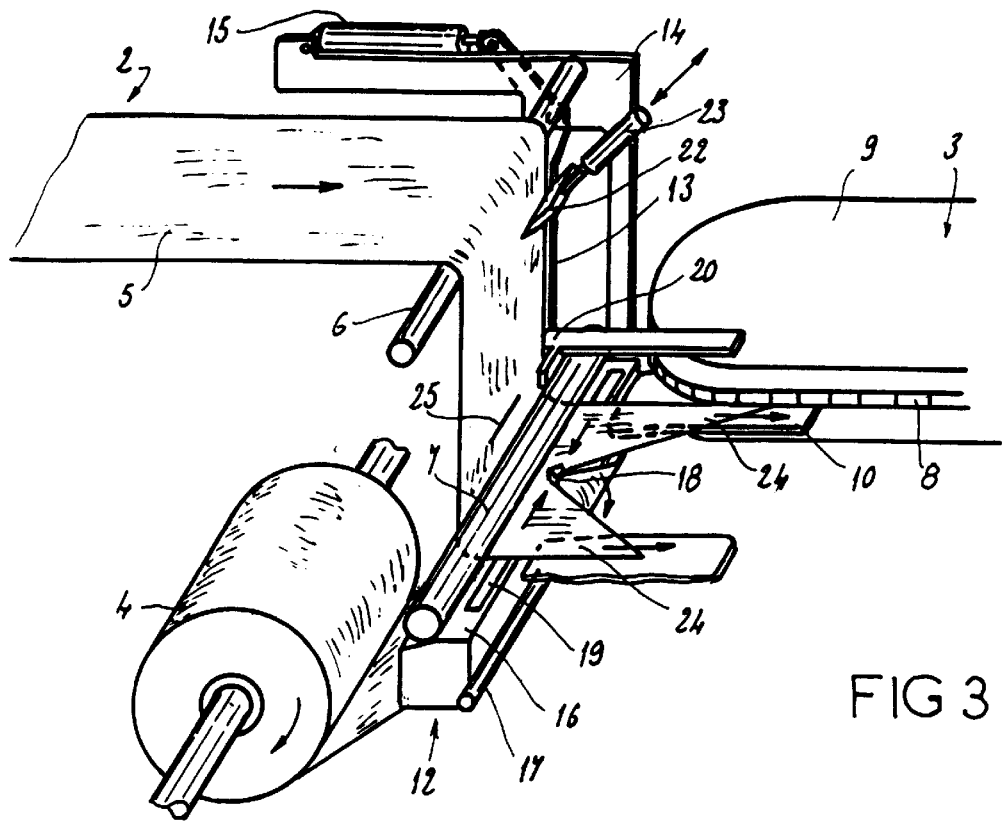
Figure 4:
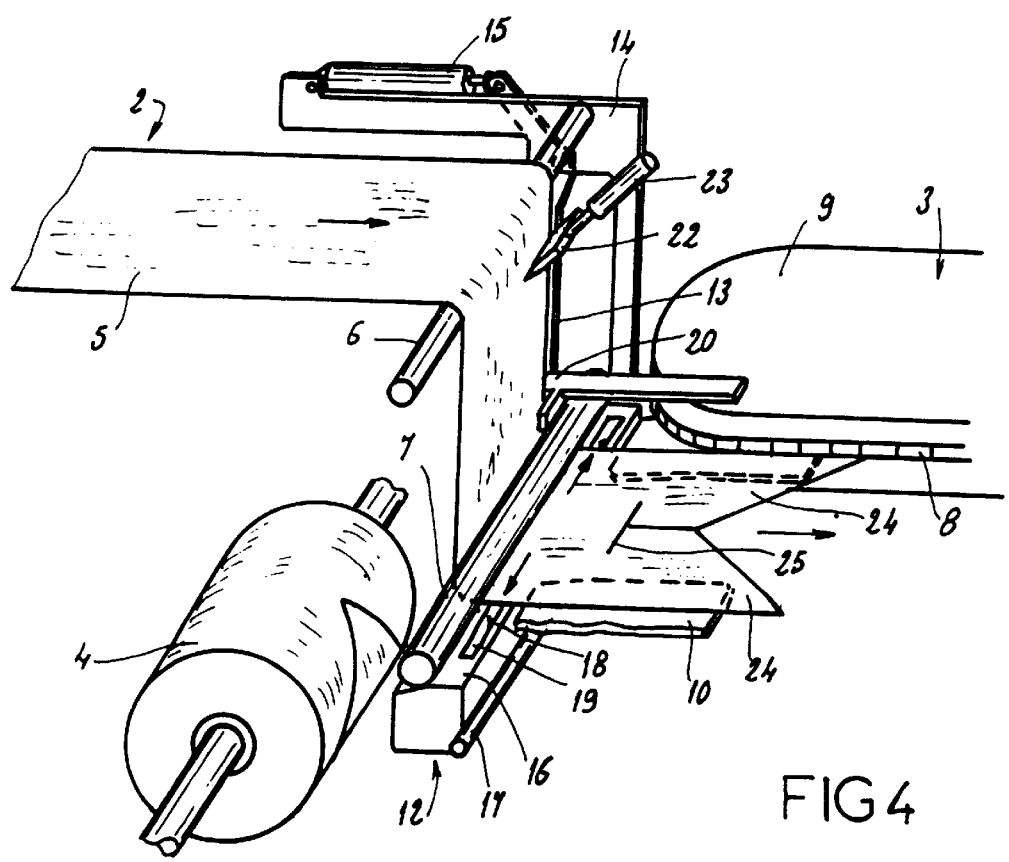
Figure 6:
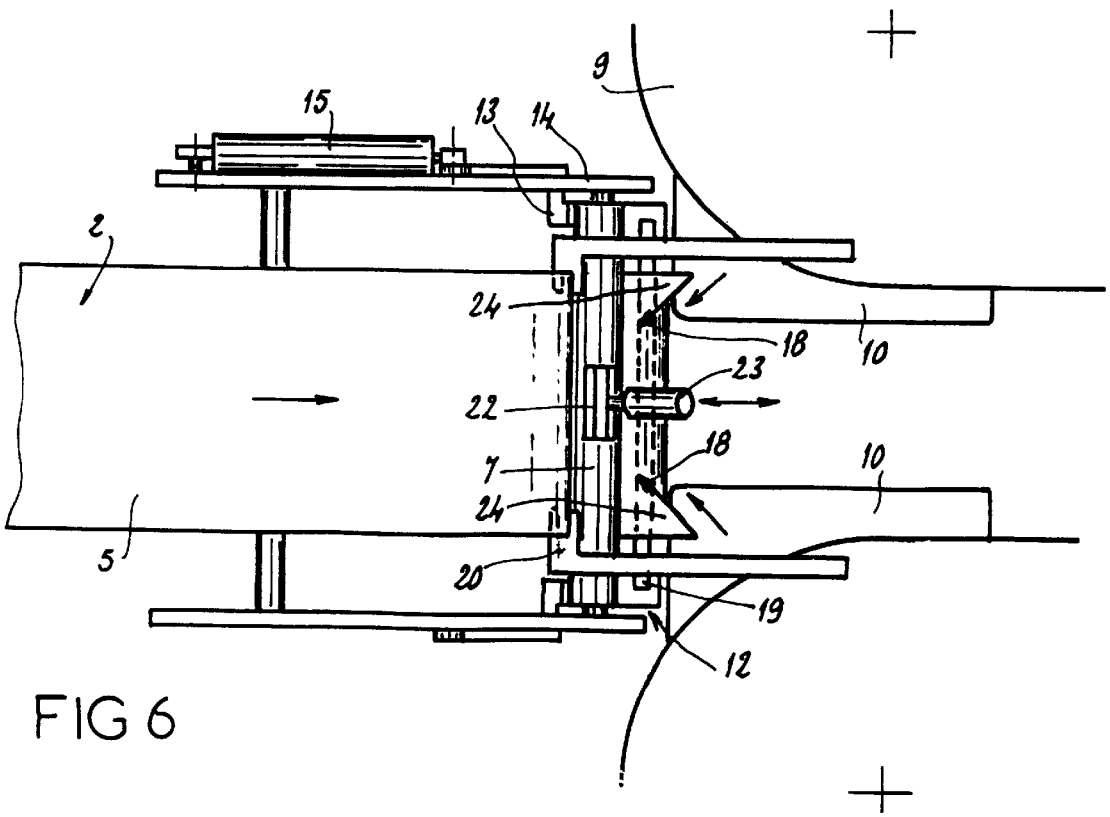
FIG. 6 is a top view during a phase in which the strip of film is cut transversely and the borders of this strip are brought to the transverse drawing machine.

Knives 18 located on either side of the strip, as shown in FIG. 2, project beyond the upper plane of the chest 12. These two knives 18 are displaced simultaneously toward the axis of the strip 5. By the combination of strip advance and knife displacement, two lateral points 24 form, as shown in FIGS. 3 and 6. Because they are free of any pulling constraint, these points continue to move horizontally while the central part of the strip continues to be pulled by the auxiliary winding mandrel. By keeping the strip under tension the mandrel provides very good conditions for cutting. When they leave chest 12, points 24 are picked up, supported, and guided by the two lifters 10. When the two knives 18 arrive at the center, their two supports meet and the knives come as close as the maximum distance required for the blades to come to a stop, namely within a few millimeters of each other. Before the strip breaks at its central part, knives 18 are retracted. The opposite tensions caused by the pulls of tenters 8 and of auxiliary winding mandrel 4 cause the small central band of the strip 5, not cut by the knives, to break. To prevent a tear from propagating in the central part of the strip, knife 22 is actuated by actuator 23 to form a transverse preliminary cut 25.

Insertion into the transverse drawing machine then becomes effective. The auxiliary winding mandrel 4 is stopped, lifters 10 are lowered, and the chest 12 is returned to its retracted position corresponding to the position in FIG. 1.

At right angles to the engagement of tenters 8, the lifters 10 have an inclined relief relative to the film travel axis in order to guide the film 5 and gently force it into the tenters 8. Other deflectors, not shown in the drawing, are provided around knives 18 to prevent points 24 from tangling immediately after cutting.

In exemplary embodiments of the method of this invention, this device has control means, for example a computer or a microprocessor (not shown) carrying out the following successive operations after the strip 5 leaves the longitudinal drawing machine or as it is being wound onto the auxiliary winding mandrel 4:

bringing chest 12 into its position located between fixed cylinder 7 and reversing pulleys 9 at the entrance of the transverse drawing machine, bringing the reversing pulleys 9 together until the bottoms of tenters 18 are aligned with the film edges, moving lifters 10 upward, synchronizing the speeds of the chains carrying tenters 8 with the speed of the longitudinal drawing machine, cutting strip 5 with the aid of the knives, engaging the cut end of strip 5 between the tenters 8, stopping auxiliary winding mandrel 4, and retracting chest 12.

As can be seen from the foregoing, the invention provides a major improvement to the existing technology by furnishing a device of simple design that automates insertion of a strip of film into a transverse drawing machine, which can be done at high speed, thus improving the quality of the products while avoiding a gradual increase in machine speed and preventing physical hazards to the operators.

What is claimed is:

1. A device for automatic insertion of a strip of synthetic film coming from a longitudinal drawing machine into a transverse drawing machine, said transverse drawing machine having two endless chains carrying tenters designed to grip edges of the film, the two chains spaced apart from each other, with the two chains passing, adjacent to an entrance of the transverse drawing machine, onto reversing pulleys, an auxiliary winding mandrel being disposed at an exit of the longitudinal drawing machine, below said exit, comprising:

a fixed cylinder with an axis perpendicular to a travel axis of the film, located upstream of the entrance to the transverse drawing machine, a lower generatrix of said fixed cylinder being located in a travel plane of the film in the transverse drawing machine, a chest having a slot provided in an upper surface of the chest and having an axis perpendicular to the travel axis of the film, mounted on a movable support, displaceable between a retracted position and a position in which the chest is located between said fixed cylinder and the entrance to the transverse drawing machine, the upper surface of the chest then being disposed substantially in the film travel plane in the transverse drawing machine, the chest serving to accommodate at least one knife displaceable in the direction of the chest axis and retractable so that it either projects or does not project beyond said slot, and two lifters, each of said lifters being in working relation with a reversing pulley of the transverse drawing machine for displacing the film between a lower position and a position in which it is located in a travel plane of the film tenters.

2. Device according to claim 1, wherein the chest contains two coaxial knives, movements of the knives being controlled symmetrically from an outside toward a center.

3. Device according to claim 2, further comprising a variable-speed system that drives the knives.

4. Device according to claim 2, wherein the knives are mounted on an oscillating system so that they are freely oriented according to a film cutting angle.

5. Device according to claim 1, wherein the chest is equipped with a deflecting roller that guides the film to said auxiliary winding mandrel before insertion into the transverse drawing machine.

6. Device according to claim 1, wherein the chest is attached to a chassis pivotably mounted on an arm which is independent of or part of the longitudinal drawing machine.

7. Device according to claim 1, further comprising a knife disposed upstream of said chest on a travel axis of the film, actuatable by an actuator to perforate the film transversely over a width of several centimeters and prevent any risk of a tear propagating after the film is cut.

8. Device according to claim 1, further comprising control means for carrying out the following successive operations after the film leaves the longitudinal drawing machine or as it is being wound onto the auxiliary winding mandrel, the control means having:

means for controlling bringing the chest into the position of the chest located between the fixed cylinder and the reversing pulleys at the entrance of the transverse drawing machine, means for controlling bringing the reversing pulleys together until the bottoms of the tenters are aligned with the film edges, means for controlling moving the lifters upward, means for controlling synchronizing the speeds of the chains carrying the tenters with the speed of the longitudinal drawing machine, means for controlling cutting the strip with the aid of the at least one knife, means for controlling engaging the cut end of the strip between the tenters, means for controlling stopping the auxiliary winding mandrel, and means for controlling retracting the chest.

9. A drawing system comprising:

a longitudinal drawing machine;

an auxiliary winding mandrel disposed at and below an exit of the longitudinal drawing machine;

a transverse drawing machine, said transverse drawing machine having two endless chains carrying tenters designed to grip edges of the film, the two chains spaced apart from each other, with the two chains passing, adjacent to an entrance of the transverse drawing machine, onto reversing pulleys; and a device for automatic insertion of a strip of synthetic film coming from the longitudinal drawing machine into the transverse drawing machine, wherein said device for automatic insertion comprises:

a fixed cylinder with an axis perpendicular to a travel axis of the film, located upstream of the entrance to the transverse drawing machine, a lower generatrix of said fixed of said fixed cylinder being located in a travel plane of the film in the transverse drawing machine, a chest having a slot provided in an upper surface of the chest and having an axis perpendicular to the travel axis of the film, mounted on a movable support, displaceable between a retracted position and a position in which the chest is located between said fixed cylinder and the entrance to the transverse drawing machine, the upper surface of the chest then being disposed substantially in the film travel plane in the transverse drawing machine, the chest serving to accomodate at least one knife displaceable in the direction of the chest axis and retractable so that it either projects or does not project beyond said slot, and two lifters, each of said lifters being in working relation with a reversing pulley of the transverse drawing machine for displacing the film between a lower position and a position in which it is located in a travel plane of the film tenters.

10. The drawing system of claim 9, wherein the two reversing pulleys of the transverse drawing machine are displaceable transversely relative to each other.

11. The drawing system of claim 10, wherein the reversing pulleys of the transverse drawing machine are each equipped with a detector that detects the position of an edge of the film and prevents the reversing pulleys from coming together when bottoms of tenters are aligned with the film edges.

12. The drawing system of claim 11, wherein said detectors are mechanically connected to the two reversing pulleys and are disposed upstream of said fixed cylinder.

13. The drawing system of claim 9, wherein the chest contains two coaxial knives, movements of the knives being controlled symmetrically from an outside toward a center.

14. The drawing system of claim 13, further comprising a variable-speed system that drives the knives.

15. The drawing system of claim 13, wherein the knives are mounted on an oscillating system so that they are freely oriented according to a film cutting angle.

16. The drawing system of claim 9, wherein the chest is equipped with a deflecting roller that guides the film to said auxiliary winding mandrel before insertion into the transverse drawing machine.

17. The drawing system of claim 9, wherein the chest is attached to a chassis pivotably mounted on an arm which is independent of or part of the longitudinal drawing machine.

18. The drawing system of claim 9, further comprising a knife disposed upstream of said chest on a travel axis of the film, actuatable by an actuator to perforate the film transversely over a width of several centimeters and prevent any risk of a tear propagating after the film is cut.

19. The drawing system of claim 9, further comprising control means for carrying out the following successive operations after the film leaves the longitudinal drawing machine or as it is being wound onto the auxiliary winding mandrel, the control means having:

means for controlling bringing the chest into the position of the chest located between the fixed cylinder and the reversing pulleys at the entrance of the transverse drawing machine, means for controlling bringing the reversing pulleys together until the bottoms of the tenters are aligned with the film edges, means for controlling moving the lifters upward, means for controlling synchronizing the speeds of the chains carrying the tenters with the speed of the longitudinal drawing machine, means for controlling cutting the strip with the aid of the at least one knife, means for controlling engaging the cut end of the strip between the tenters, means for controlling stopping the auxiliary winding mandrel, and means for controlling retracting the chest.

* * * * *

UNITED STATES PATENT AND TRADEMARK OFFICE
CERTIFICATE OF CORRECTION

PATENT NO.     : 6,270,334 B1
DATED          : August 7, 2001
INVENTOR(S)    : Alain Cozian It is certified that error appears in the above-identified patent and that said Letters Patent is hereby corrected as shown below:

Please replace claim 9 as follows:

9. A drawing system comprising:
a longitudinal drawing machine;
an auxiliary winding mandrel disposed at and below an exit of the longitudinal drawing machine;
a transverse drawing machine, said transverse drawing machine having two endless chains carrying tenters designed to grip edges of the film, the two chains spaced apart from each other, with the two chains passing adjacent to an entrance of the transverse drawing machine, onto reversing pulleys; and
a device for automatic insertion of a strip of synthetic film coming from the longitudinal drawing machine into the transverse drawing machine, wherein said device for automatic insertion comprises:
a fixed cylinder with an axis perpendicular to a travel axis of the film, located upstream of the entrance to the transverse drawing machine, a lower generatrix of said fixed cylinder being located in a travel plane of the film in the transverse drawing machine,
a chest having a slot provided in an upper surface of the chest and having an axis perpendicular to the travel axis of the film, mounted on a movable support, displaceable between a retracted position and a position in which the chest is located between said fixed cylinder and the entrance to the transverse drawing machine, the upper surface of the chest then being disposed substantially in the film travel plane in the transverse drawing machine, the chest serving to accommodate at least one knife displaceable in the direction of the chest axis and retractable so that it either projects or does not project beyond said slot, and

UNITED STATES PATENT AND TRADEMARK OFFICE
CERTIFICATE OF CORRECTION

PATENT NO.    : 6,270,334 B1
DATED         : August 7, 2001
INVENTOR(S)   : Alain Cozian It is certified that error appears in the above-identified patent and that said Letters Patent is hereby corrected as shown below:

two lifters, each of said lifters being in working relation
   with a reversing pulley of the transverse drawing
   machine for displacing the film between a lower position
   and a position in which it is located in a travel plane of
   the film tenters.

Signed and Sealed this

Ninth Day of April, 2002

*Attest:*

JAMES E. ROGAN
*Attesting Officer*     *Director of the United States Patent and Trademark Office*